July 22, 1952 G. GREY 2,603,927
PACKAGING APPARATUS
Filed Jan. 13, 1947 12 Sheets-Sheet 1

INVENTOR
George Grey
BY
ATTORNEY

July 22, 1952 G. GREY 2,603,927
PACKAGING APPARATUS
Filed Jan. 13, 1947 12 Sheets-Sheet 2
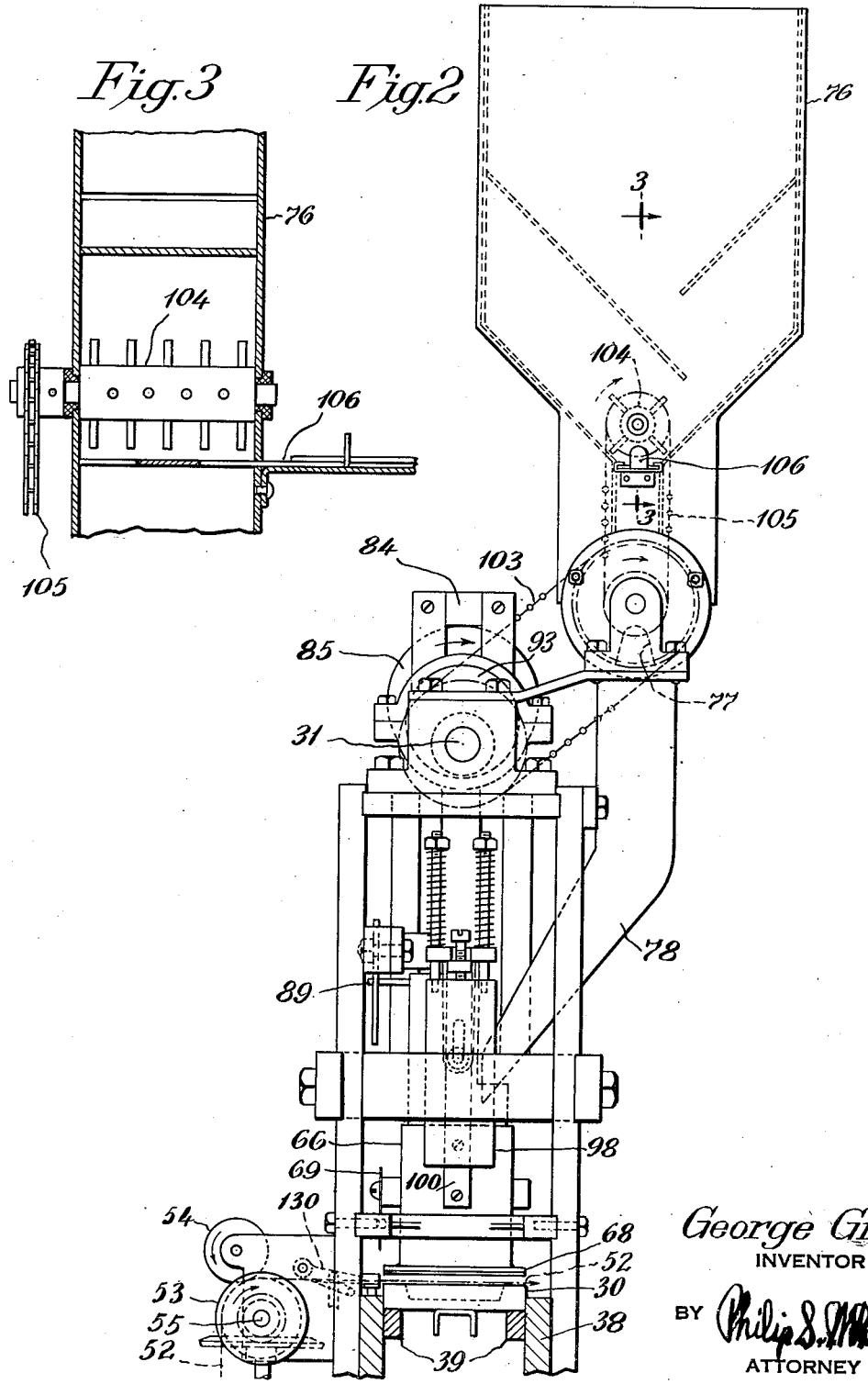

July 22, 1952  G. GREY  2,603,927
PACKAGING APPARATUS
Filed Jan. 13, 1947  12 Sheets-Sheet 3
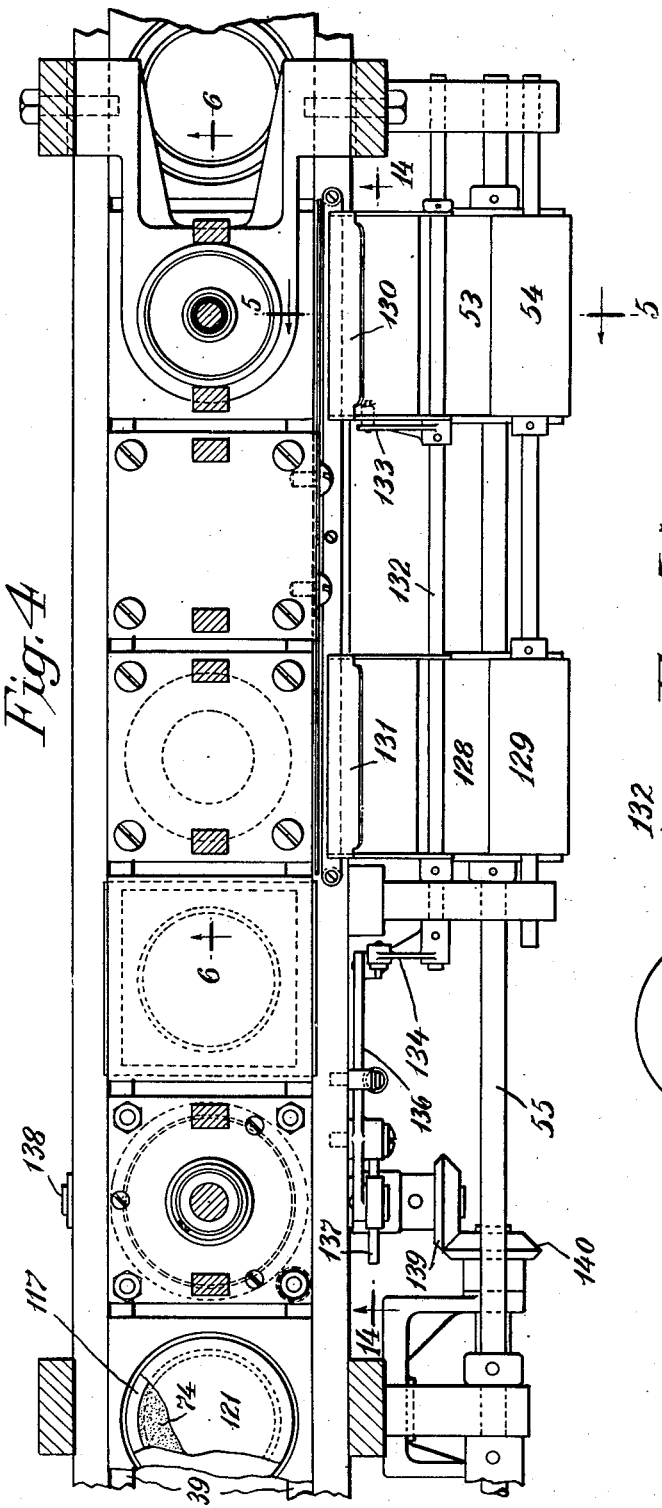
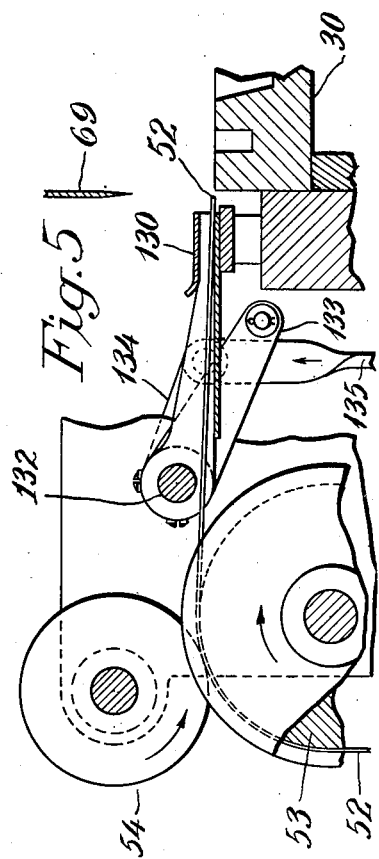
George Grey
INVENTOR
BY Philip S. M'Kean
ATTORNEY

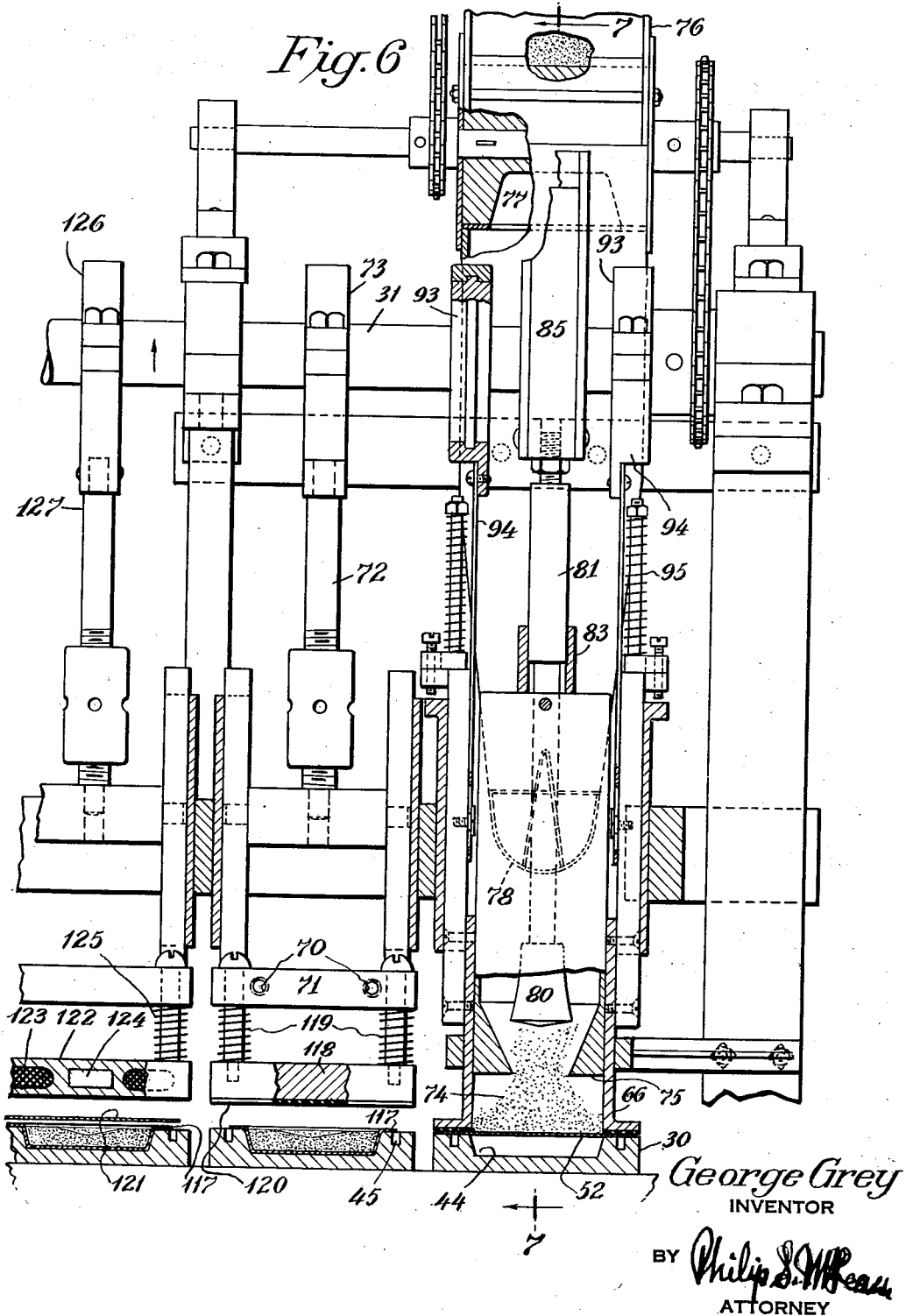

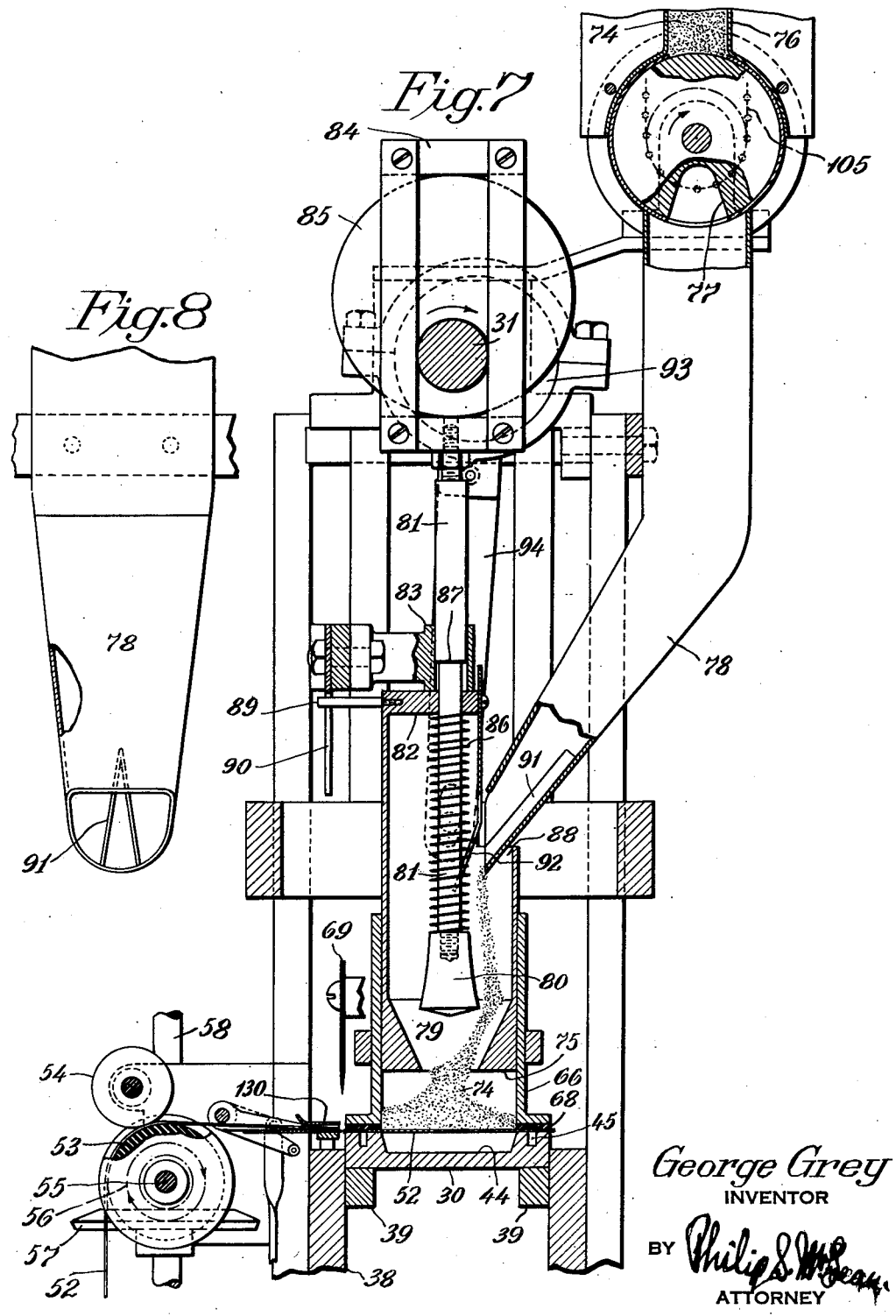

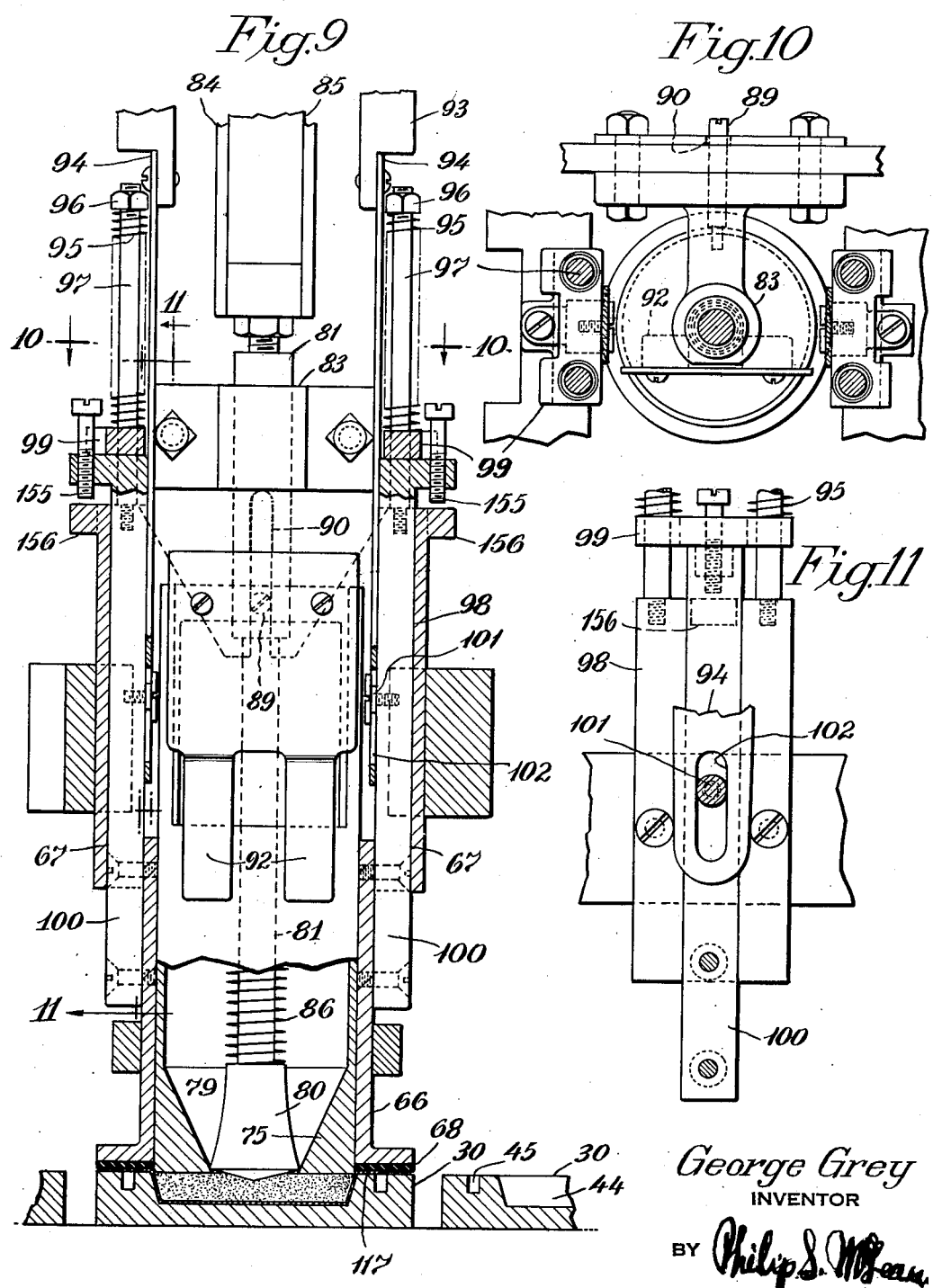

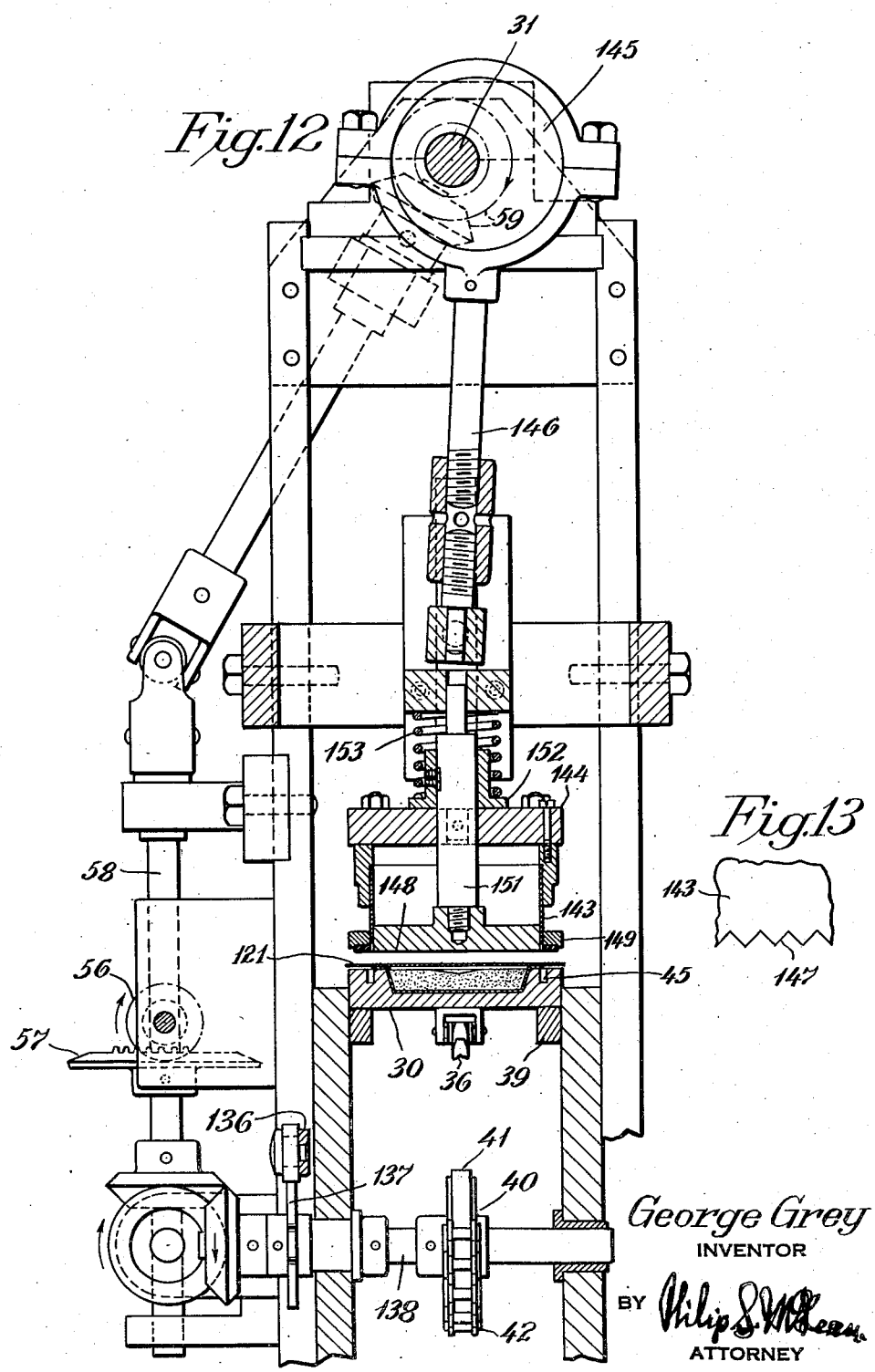

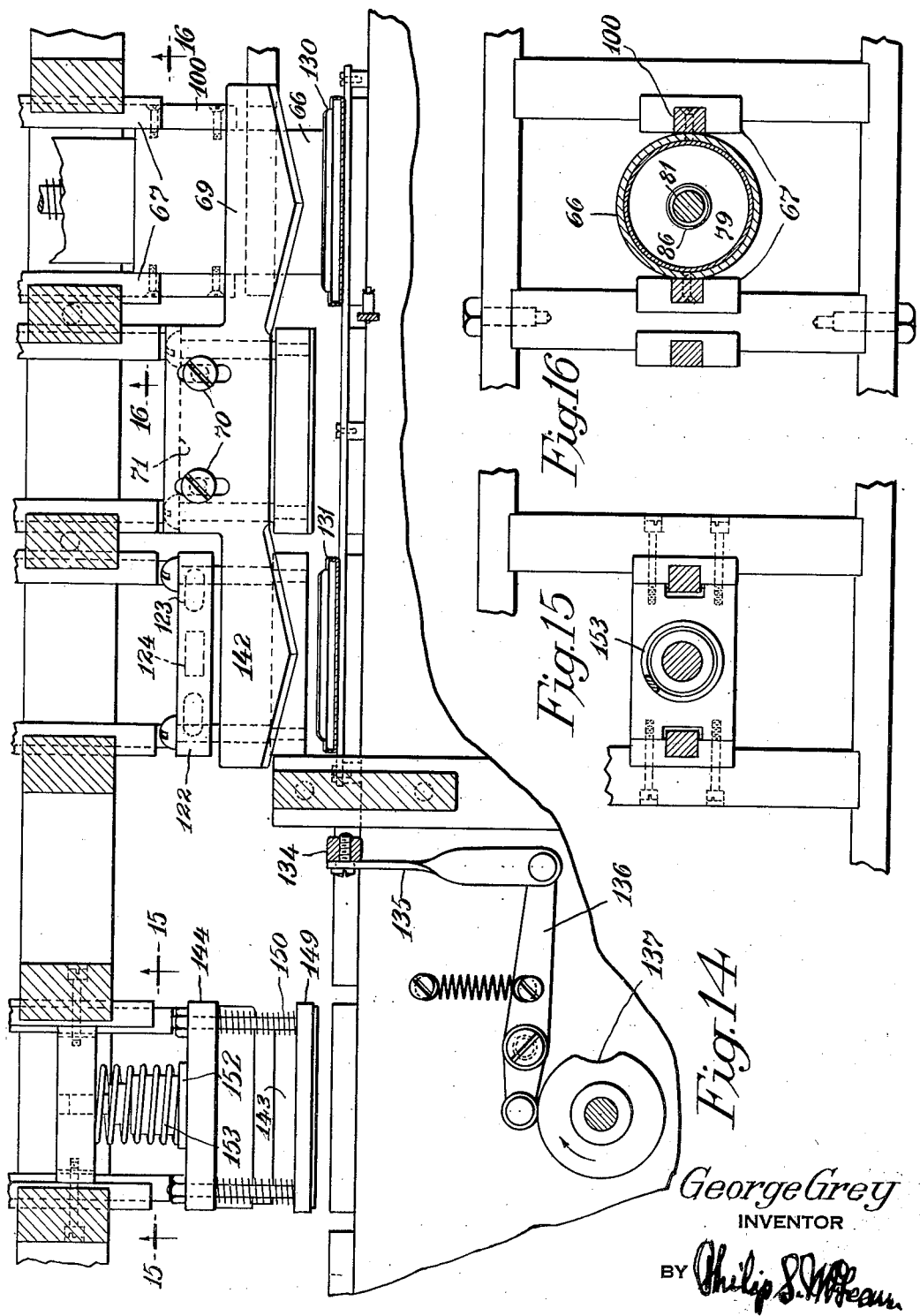

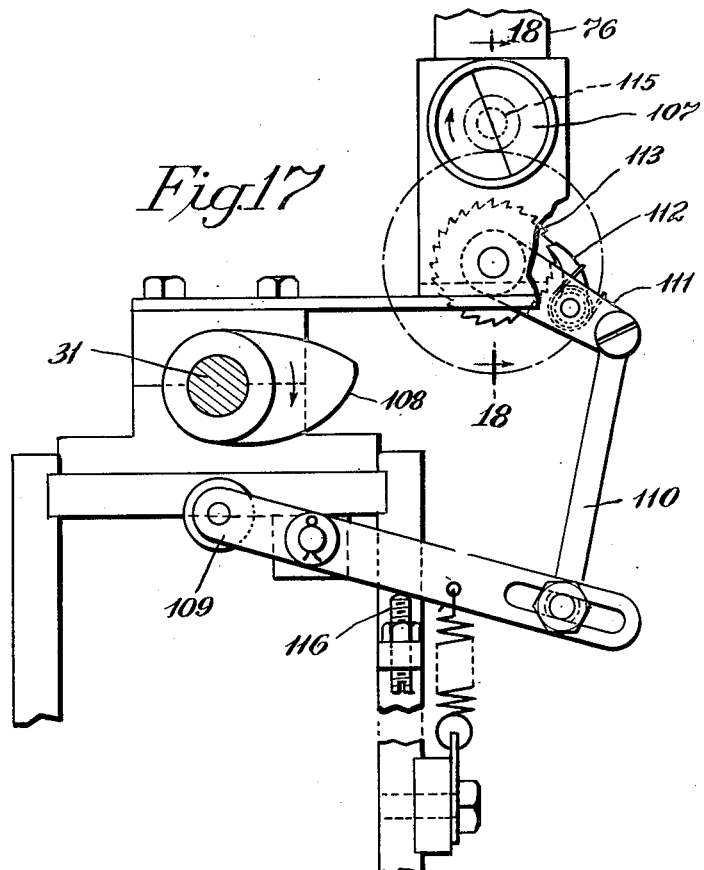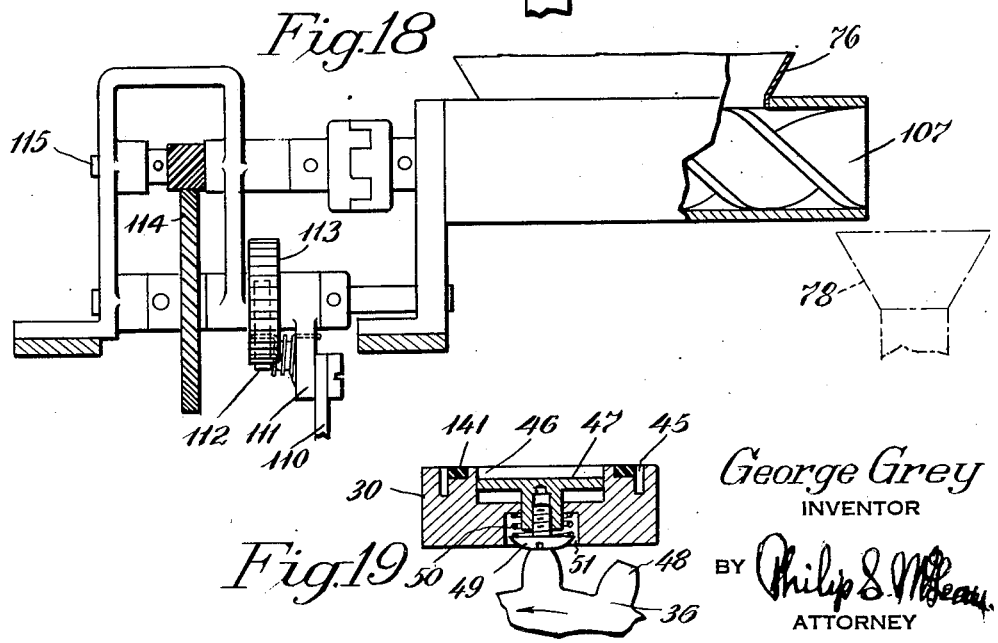

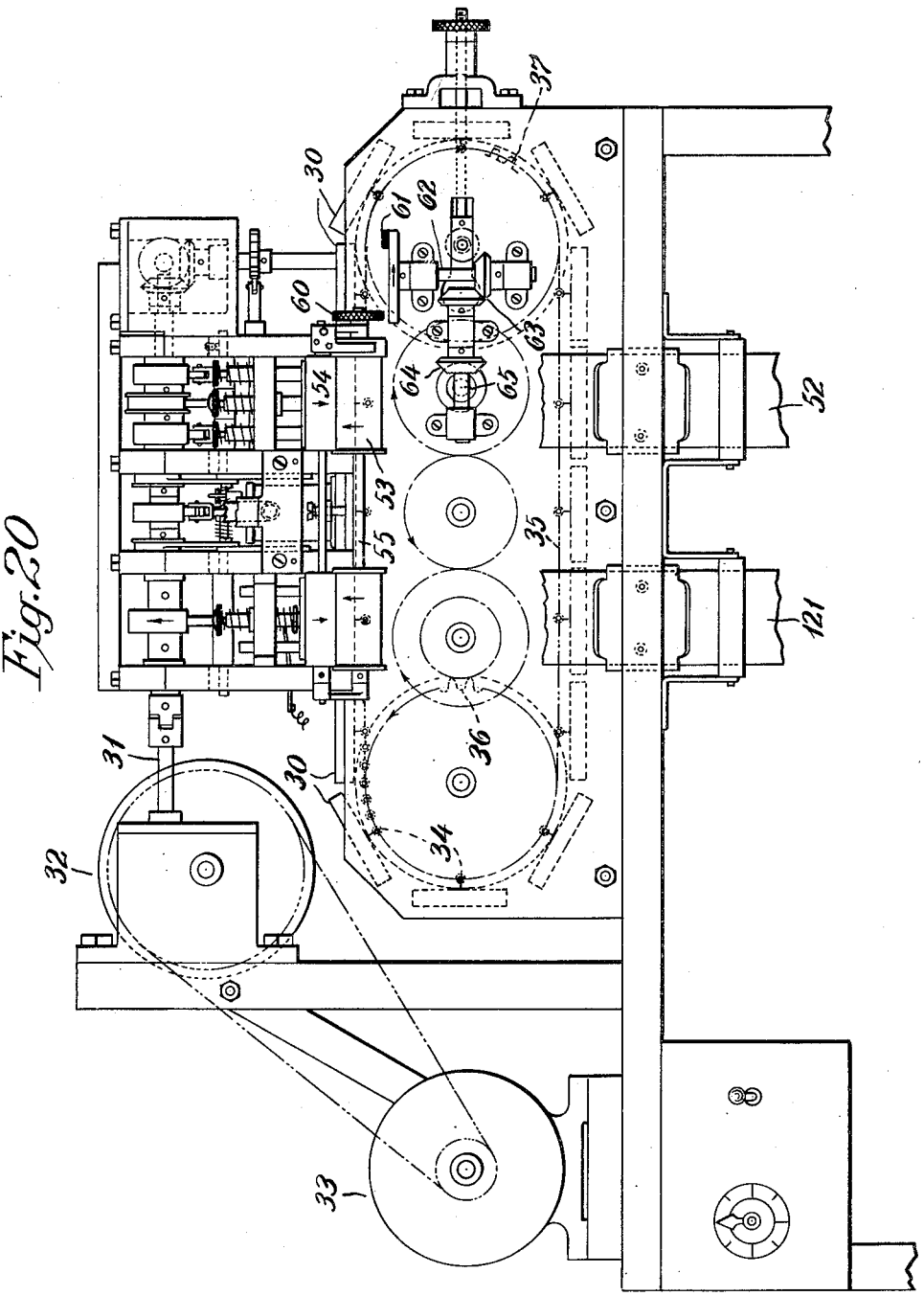

July 22, 1952

G. GREY 2,603,927

PACKAGING APPARATUS

Filed Jan. 13, 1947

INVENTOR
George Grey
BY
ATTORNEY

July 22, 1952            G. GREY            2,603,927
PACKAGING APPARATUS
Filed Jan. 13, 1947            12 Sheets-Sheet 12
*Fig.23*
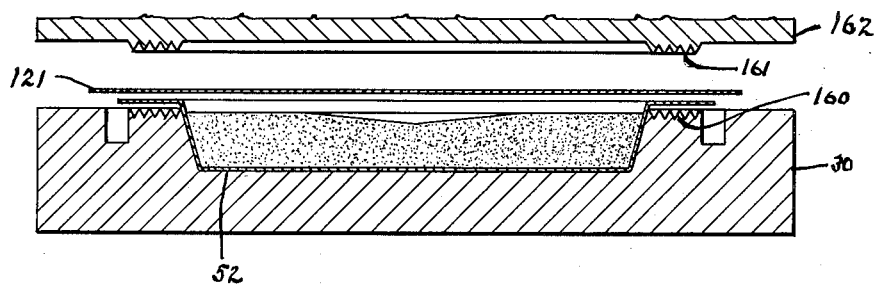
*Fig.24*          *Fig.25*
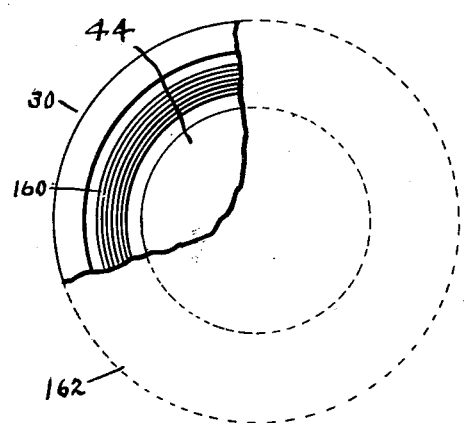 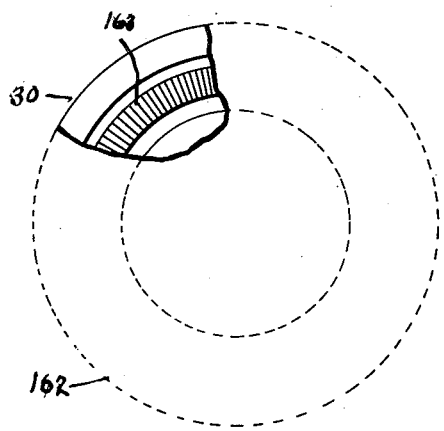
George Grey
INVENTOR
BY
ATTORNEY Patented July 22, 1952

2,603,927

UNITED STATES PATENT OFFICE 2,603,927

PACKAGING APPARATUS

George Grey, Pawling, N. Y., assignor, by mesne assignments, to Harry J. Kurrus, Pawling, N. Y.

Application January 13, 1947, Serial No. 721,705

5 Claims. (Cl. 53—57)

The invention disclosed in this patent application relates to the packing of such materials as coffee and tea in packages suitable for extraction of the essence in the form of beverages.

These packages may be made up of two layers of filter paper, one cupped to form a container for the material and the other secured as a cover over the first.

Special objects of the present invention are to provide a commercially practical machine for automatically forming such packages and one which will operate uniformly at a high production rate and for the results accomplished be of relatively simple construction, reasonable in cost and generally efficient and dependable.

Other objects of the invention are set forth or will appear in the course of the following specification, wherein the novel features of the invention are particularly pointed out and broadly claimed.

The drawings accompanying and forming part of the specification illustrate certain present embodiments of the invention. Structure and mode of operation, however, may be modified and changed as regards the immediate disclosure, all within the true intent and broad scope of the invention as herein defined and claimed.

Fig. 1 in the drawings is a front elevation of one of the packing machines embodying the invention, parts appearing as broken away;

Fig. 2 is an enlarged end and part transverse sectional view appearing as on substantially the plane of line 2—2 of Fig. 1 and showing in particular the loading or charging mechanism;

Fig. 3 is a fragmentary sectional view of a portion of the loading hopper as on substantially the plane of line 3—3 of Fig. 2;

Fig. 4 is a broken horizontal sectional view as on the plane of line 4—4 of Fig. 1 and showing the several stations for loading and forming, pressing, closing and sealing, and trimming the packages;

Fig. 5 is a broken sectional view as on line 5—5 of Fig. 4, showing the paper lifting and cut-off mechanism at the first station;

Fig. 6 is a broken, vertical, longitudinal sectional view on substantially the plane of line 6—6 of Fig. 4, showing mechanism at the first loading and forming station, the second, pressing and smoothing station and the third, covering and sealing station;

Fig. 7 is a vertical cross sectional view on substantially the plane of line 7—7 of Fig. 6, illustrating the loading or charging step;

Fig. 8 is an enlarged and broken part sectional detail showing particularly the spreader at the lower end of the loading chute;

Fig. 9 is a broken longitudinal sectional view of mechanism at the first station and illustrating the charging and final forming stage of operation;

Figure 1:
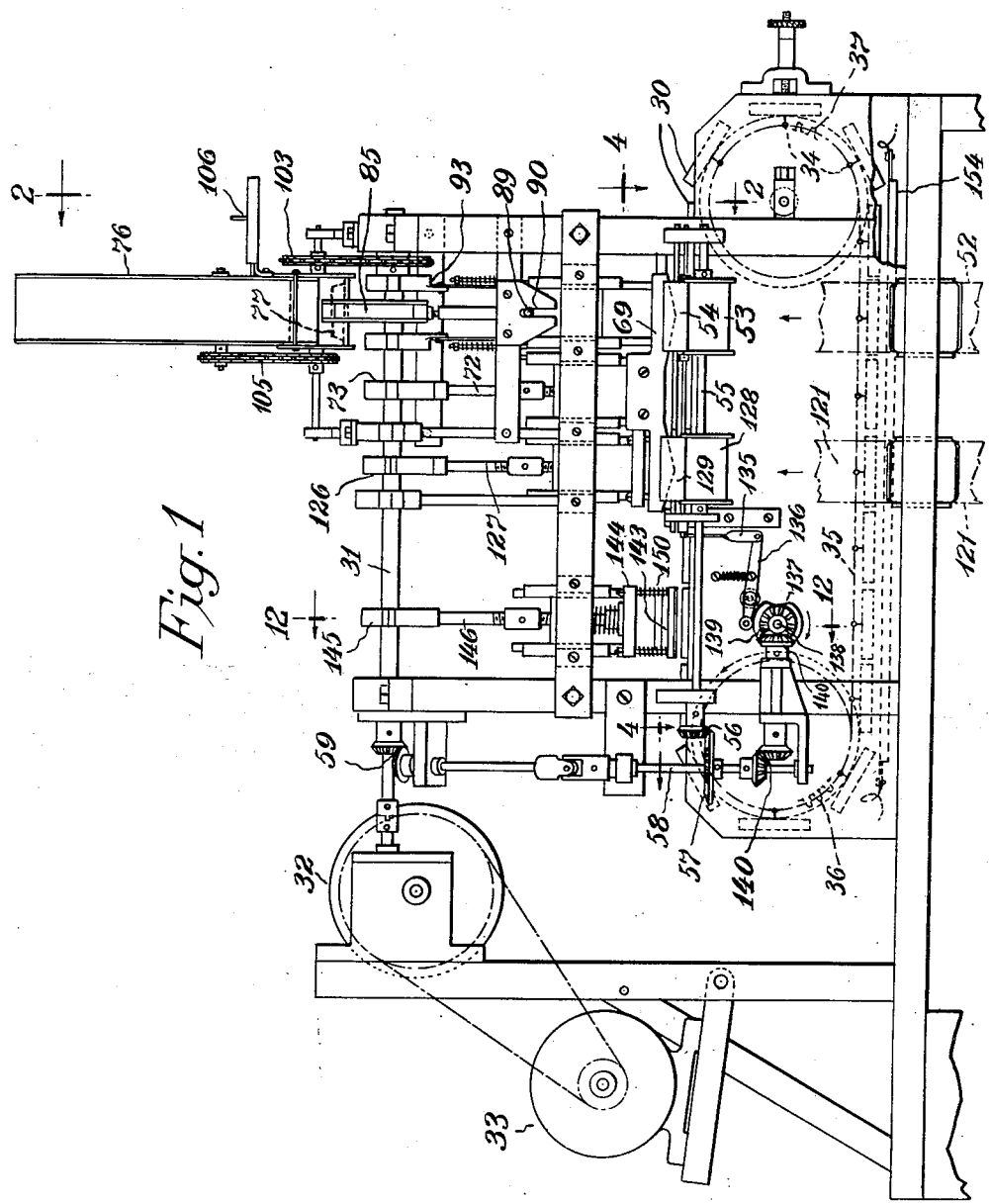
Figures 21, 22:
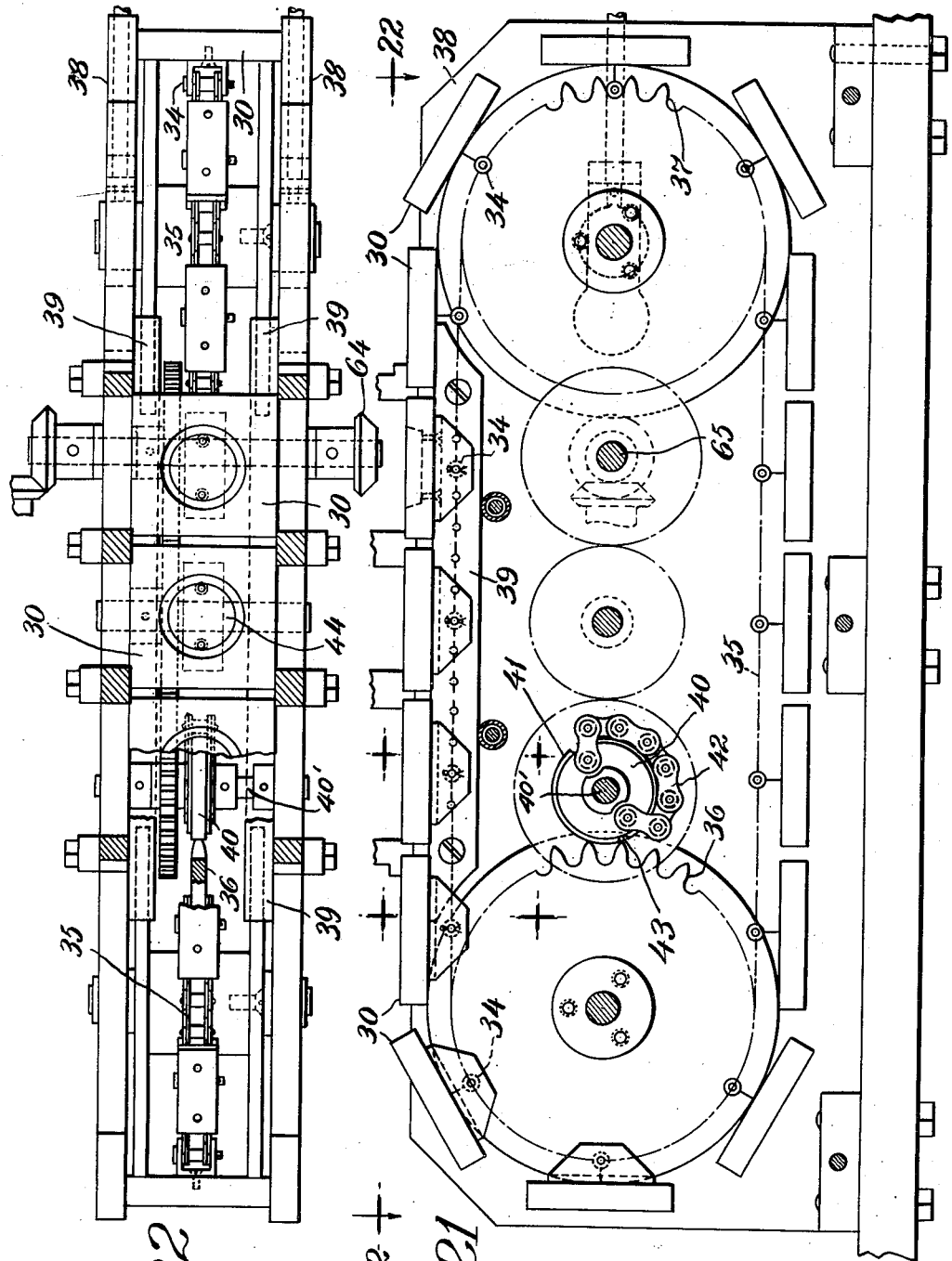

Figs. 10 and 11 are broken sectional details of parts appearing on substantially the planes of lines 10—10 and 11—11, respectively, of Fig. 9;

Fig. 12 is a broken cross sectional view on substantially the plane of line 12—12 of Fig. 1, illustrating the final trimming operation;

Fig. 13 is a fragmentary detail of a circular trimming knife;

Fig. 14 is a vertical, longitudinal sectional view as on substantially the plane of line 14—14 of Fig. 4;

Figs. 15 and 16 are broken horizontal sectional views as on the lines 15—15 and 16—16 of Fig. 14;

Figs. 17 and 18 are broken cross sectional and longitudinal sectional details illustrating a modified form of material feeding mechanism;

Fig. 19 is a broken sectional detail of a modified form of forming mold and ejector;

Fig. 20 is a broken front view of a modified embodiment of the invention;

Fig. 21 is a broken sectional view showing details of the intermittent drive mechanism of the mold carrier;

Fig. 22 is a broken horizontal sectional view of parts on substantially the plane of line 22—22 of Fig. 21;

Fig. 23 is a broken sectional and somewhat diagrammatic representation of means for corrugating the meeting flanges of the layers of material forming the body and top of the cartridge;

Fig. 24 is a broken plan and diagrammatic view illustrating the formation of the concentric corrugations produced by the mechanism of Fig. 23; and Fig. 25 is a similar view illustrating formation of radial corrugations, this view and Fig. 24 being somewhat diagrammatic in character.

As shown in the general views, Figs. 1 and 20, the machine comprises a series of package shaping molds or dies 30 operating as a conveyer beneath and in cooperation with plungers and related parts performing the several required operations, actuated by cams or eccentrics on an overhead cam shaft 31 driven through suitable reduction gearing 32 from a motor 33.

The individual molds are shown pivotally connected at 34 with an endless sprocket chain 35 supported on sprocket gears 36, 37.

The mold blocks or dies 30 are shown in Figs.

21 and 22 as guided between parallel side plates 38 and as supported at the operative package shaping portion of their circuit by riding over side supporting rails 39.

Intermittent movement is imparted to the mold actuating sprocket chain 35, in the illustration, by a continuously rotating driver 40, Figs. 21 and 22, having a smooth, circular, peripheral portion 41 to bridge adjoining teeth of the sprocket 36 for locking it in the rest positions and carrying a segment 42 of sprocket chain to mesh the teeth and drive the sprocket a portion of each revolutaion of shaft 40'. The peripheral portion of the driver 41 is notched or relieved at 43 to admit the point of the then nearest sprocket tooth and thus unlock the sprocket immediately before the chain segment moving clockwise, Fig. 21, meshes the teeth 36. The couple described operates as a Geneva gear to intermittently drive and hold the conveyer chain. Other forms of intermittent drive gear may be used, as will be evident.

The mold plates 30 are shown as having flat, shallow, mold cavities 44 of circular outline, surrounded by an annular groove 45. These mold cavities may be beveled or conical in shape, as shown in Figs. 6 and 7, or they may be cylindrical with straight side walls, as shown at 46 in Fig. 19, to accommodate the movement of an ejector plunger 47 seating in the bottom of the mold cavity and having a projecting stud for engagement with and actuation by a tooth 48 of the drive sprocket 36. In the illustration the projecting stud is shown as a screw 49 adjustably engaged with the back of the ejector plunger and acted upon by a spring 50 seating in a cavity 51 in the back of the mold and serving to hold the discharge plunger in retracted relation up to the time of passage of the mold over the top of the drive sprocket.

At the first station, the one at the right in Fig. 1, a sheet of container-forming material such as filter paper 52, is fed across the top of the cavity in the mold at rest at that station. The feed is accomplished, in the illustration, by the coaction of feed and gripping rolls 53, 54, Figs. 2 and 7, the roll 53 being fixed on shaft 55, intermittently driven through a bevel pinion 56, Fig. 1, on the end of said shaft 55 and intermittently engaged by the teeth of an interrupted gear 57 on upright shaft 58 driven continuously through bevel gearing 59 from the overhead cam shaft 31.

The form of intermittent paper feed may vary. For example, as shown in Fig. 20, the lower feed roll shaft 55 may carry a friction gear 60 for engagement by the friction gear segment 61 on an upright shaft 62 driven through bevel gearing 63 and 64 from a continuously rotating shaft 65 forming, in this modification, part of the driving train for the mold conveyer.

After the paper to form the container is fed into position over the mold cavity, a hollow plunger 66 carried by guides 67, Figs. 9 and 14, is lowered to press the resilient washer 68 at the lower end of this plunger into gripping engagement over the edge portions of the paper overlying the top of the mold about the cavity, and at or about such time a knife 69, Figs. 7 and 14, adjustably secured at 70 to the vertically sliding head 71, is lowered by the rocking link 72 and eccentric 73 on the overhead cam shaft 31, to cut off the advanced length of paper so held.

The tubular plunger 66, in addition to gripping the paper, serves as a container for holding a charge of the material being packed, in position on the paper.

In Figs. 6 and 7, the material such as coffee, tea or the like, is shown at 74, confined by the lowered tubular plunger 66 on top of the paper, ready to be driven by an inner plunger 75 downward to conform the paper to the shape of the mold cavity and to pack the material into the cupped formation so produced, as indicated in Fig. 9.

The inner plunger 75 is of tubular formation to pass the material downwardly through the same.

This feature is shown in Fig. 7, where the material is indicated as supplied from a hopper 76 and passing downwardly therefrom under control of a pocketed measuring roll 77 into a feed chute 78 delivering into the open upper end of the plunger.

The lower end of the inner plunger is shown as having a beveled or contracted central discharge passage 79 for heaping the material onto the central portion of the paper so that it will spread and flow laterally beneath the end of this plunger, and means are provided for automatically closing this passage at the end of the delivery action, to form a substantially solid head for compressing and forming the material and paper into the package shape.

In the illustration, the automatic closing means is shown as including a reversely tapered plug 80, of a size to substantially close the convergent delivery passage 79, said plug being fixed on the lower end of a rod 81 extending loosely up through the upper end portion 82 of the inner plunger and guided for straight up and down movement in a bracket 83. An eccentric box 84 at the upper end of this rod rides an eccentric 85 on the cam shaft 31. A spring 86 confined between the plug and the upper end portion 82 enables the plug in its up stroke to lift the inner plunger, and a shoulder 87 on the rod engages the end wall 82 in the down stroke to force the inner plunger down to the bottom of its stroke, Fig. 9.

To guide the inner, packing or forming plunger 75 and hold it with the opening 88 in the back of the same lined up with the feed chute 78, said plunger is shown as having a projecting pin 89 at the front riding in a vertical guide slot 90.

To distribute and deflect the material about the stem of the plunger closing plug 80, a divergent spreader 91 is shown disposed in the lower end of the feed chute and inwardly inclined baffles 92 are shown directly in front of such spreader and at opposite sides of the plug carrying rod 81.

The outer, paper gripping and material confining cylinder or plunger 66, is actuated, in the illustration, Fig. 6 from eccentrics 93 on the cam shaft through eccentric straps or links 94 and to allow proper dwell for this plunger while the eccentrics continue their movement, yielding couplings are provided, here shown as springs 95 interposed between abutments 96 on rods 97, Fig. 9, connected with vertical slides 98, and the lugs 99 of the slides 100 directly attached to plunger 66. The eccentric strap links 94 are shown pivotally connected with slides 98 at 101 and such links further are shown slotted at 102 to allow full rest of the plunger during the time the paper is being held, the material is being loaded thereon and material and paper are being formed into the flat disc configuration indicated in Fig. 9.

Figs. 1 and 2 show how the charge measuring roll or wheel 77 at the base of the supply hopper 76, may be driven by chain gearing 103 from the upper shaft 31 and also how a mixing and stirring roll 104 may be driven from the measuring roll shaft by chain gearing 105 to prevent caking or "bridging" of the material in the hopper. These views also show a hand operable feed cutoff slide 106 at the base of the hopper and between said rolls 77 and 104.

Different forms of feeding and measuring mechanism may be employed to suit the character of the material being packed.

Figs. 17 and 18 show how such mechanism may be of the screw feed type, involving a conveyor screw or worm 107 turning in the bottom of the hopper and delivering into the upper end of the feed chute 78, motion being imparted to the worm intermittently from a cam 108 on the cam shaft, operating a rock lever 109 connected by pivot link 110 with a swinging arm 111 carrying a dog or pawl 112 in engagement with a ratchet 113 geared at 114 to the worm carrying shaft 115.

Fig. 9 shows how the pressing of the paper to the cupped formation leaves a flange 117 about the rim of the cup resting on top of the mold plate. This flange portion, due to the drawing and gathering of the paper into the mold cavity, may have a tendency to wrinkle, curl or stand up somewhat when the pressure of the outer, containing plunger 66 is removed.

To smooth out any such wrinkles and flatten down the flange 117, the vertically operating head 71 at the second mold station, may carry a presser head 118, Fig. 6, yieldingly backed up by springs 119 and faced with yielding or other material 120, for smoothing and flattening the flange.

At the third mold station a cover strip 121, which may be of the same filter paper as the bottom strip, is fed in over the top of the filled container, cut off and sealed to the outstanding flange of the container.

The filter paper employed for the top and bottom layers may be treated with or carry a certain amount of vinylite or other thermoplastic medium. Using such paper, it is possible to effect the seal by heating the head or platen 122 at the third, covering and sealing station.

This may be accomplished, as shown in Fig. 6, by locating an electric heater or heaters 123 in the platen 122, governed by a thermal controller 124 to maintain a proper sealing temperature. The sealing platen 122 is shown yieldingly backed up by springs 125 and as actuated from an eccentric 126 on the overhead cam shaft through an eccentric strap or pitman connection 127.

To avoid loss of heat from the sealing platen to the molds, which may be of aluminum or other metal, and to aid in effecting a complete, uniform, annular seal between the flange of the container and the cover layer, the mold plates may be constructed as shown in Fig. 19, with annular cushioning pads 141 of rubber or other suitable material, to support the flanges and which will not absorb heat to the extent of cooling the platen.

The paper feed for the third station may be similar to that first described, embodying a feed roll 128 on the intermittently driven shaft 55, Fig. 1, in cooperation with a gripping roll 129.

To save time and speed production, the paper for the bottom and top forming layers is fed while the conveyor is making its intermittent movements so as to be in position over the molds immediately the conveyor comes to rest. This means that the paper for these two layers will be advanced over traveling molds, the first carrying a formed bottom container which has just been loaded and the second containing a loaded container which has just had the flange pressed at the second station.

Certain precautions are taken to assure that the entering strips of paper will clear these loaded capsules.

In the illustration, the mechanism for the purpose comprises guides for directing the strips of paper, which are automatically raised at the right instants to direct the entering strips upward over the top of the loaded capsules.

The paper guides for the two strips are shown at 130, 131, Figs. 4 and 5, the first pivoted on the rock shaft 132 and lifted by a rocker arm 133 fixed on that shaft, and the other paper guide 131 fixed on the rock shaft 132. This shaft is shown as having a rock arm 134 at one end engaged by link 135 connected with one end of the pivoted cam lever 136, Fig. 1, the latter engaging cam 137 on a cross shaft 138 driven by bevel gearing 139, 140, from the upright shaft 58 which also drives shaft 55.

The bottom strip does not have to be lifted so high to clear the last filled mold which is passing thereunder, as does the cover strip, which should fully clear the outstanding flange portion of the filled capsule which is then passing beneath the same. Also, the bottom strip need not be lifted quite as soon as the second or cover strip. The lost motion between the rocker arm 133 and the freely pivoted first paper guide 130, Fig. 5, provides the right amount of delay and lesser lift for the first paper strip, this being clear from consideration of Fig. 4, which shows that the second paper lifting guide 131 will rock with the first movement and to the full extent of movement of rock shaft 132, while the second paper lifting guide 130, will be picked up by rocker arm 133 an instant later and be lifted to the lesser extent of the lost motion between rock arm 133 and the bottom of the paper guide.

The cover strip may be cut off by the same knife or an extension of the same knife which severs the container strip. Thus, as shown in Fig. 14, the first cutter blade 69 carries an extension blade 142 which on the down stroke of the reciprocating head 71, will cut off the advanced length of the second, cover strip 121 at or approximately the time the first blade 69 is cutting the advanced length of the first, container forming strip.

The package, closed and sealed as described, may be considered as finished but for practical purposes, as for packing the cartridges in containing cartons, it is generally preferred to trim the projecting sealed-together flange portions, as by means of a circular cutter shown at 143, Figs. 1 and 12.

This cutter is shown as carried by a reciprocating head 144 actuated from the overhead eccentric 145 by a pitman 146.

The circular blade portion of the cutter is positioned to enter and cooperate with the annular grooves 45 in the molds and the edge of the same may be toothed, as indicated at 147, Fig. 13.

To further insure a clean and complete severance of the two layers constituting the flange of the finished package, the paper is preferably held at the inside of the cutter by an internal presser head 148 and at the outside by a surrounding presser pad 149. The latter is shown in Fig. 14 yieldingly mounted on the reciprocating head 144 by the spring supports 150, and the inner pad 148 is shown carried by a stem 151, Fig. 12, carrying an abutment flange 152 acted upon by a spring 153. Consequently the parts can come down, as shown in this figure, with the inner and outer presser pads engaging and holding the paper layers against the mold top before the cutter engages the paper, said pads continuing to hold the paper at opposite sides of the cutter while the cutter advances down into the cutter groove in the mold. With the form of mold shown in Fig. 19, a peripheral portion of the under face of presser pad 148 presses the paper layers against a gasket 141 which forms a shoulder at the inner edge of the annular groove 45.

While the trimming cutter may be located immediately adjoining the covering and sealing station, to allow ample clearance between parts it may be located at some subsequent station, such as at the fifth station indicated in Figs. 1, 4 and 14.

After trimming as described, the cartridges may be immediately discharged from the molds. Ordinarily they may drop out of the mold cavities as the molds turn around into inverted position at the left hand end of the machine, Figs. 1, 20 and 21.

Positive ejection is effected in the form of mold illustrated in Fig. 19, where the plunger 47 forming the bottom of the mold cavity is automatically raised as the mold passes over the top of the supporting and driving sprocket.

With certain papers it may be desirable to heat the molds sufficiently to cause the paper to conform smoothly to the mold cavity and to assume a more or less permanent "set."

Such heating of the molds may be accomplished by an electric heater shown at 154, Fig. 1, extending beneath the lower run of the mold conveyer.

Instead of shaping the container portion of the cartridge through pressure of the material being packaged and thus using the material in effect as the head portion of a shaping punch, such containers may be directly formed by a punch head corresponding in shape to the mold cavity and the thus shaped containers then be loaded with the material. For such operations the heating of the molds or of the companion shaping punch may be particularly desirable for effecting a smooth shaping, formation and more or less permanent "set" of the paper.

For such operations the lower sheet may be shaped with a forming punch at one station and the material then be loaded into the formed container at that, or at the next or at some subsequent station.

While space may be conserved by locating the trimming cutter 143 immediately adjoining the covering and sealing station, instead of spacing it one station away, as in Fig. 1, certain advantages may be attained from such spacing, for example where a sealing medium is employed which may require an interval of time for setting, or where it may be desirable to print or otherwise apply some identifying indicia or the like to the flange or possibly to a tab extension left on the flange, such as disclosed in the copending patent application of William F. Brown, Serial No. 554,834, filed September 19, 1944, now Patent 2,451,195, granted October 12, 1948. In such latter case the printing or marking mechanism may be disposed at the idle station shown in Fig. 1, between the sealing and trimming stations.

While particularly designed for packing materials such as coffee, tea and the like, it will be apparent that the machine, possibly with some modification, may be employed for packaging materials generally.

*Operation*

The molds 39, in an endless chain, advance intermittently, stopping in turn at each one of the several stations shown in Figs. 1 and 20.

At the first station, Fig. 2, the lower strip of filter paper 52 is advanced by intermittently turning feed rolls 53, 54, over the top of what may be considered the first mold.

The hollow plunger 66 then comes down to carry the clamping flange 68 into gripping engagement over the paper covering the mold cavity, Fig. 7, and while so held the paper is cut off by blade 69 and the measuring mechanism delivers a charge of the ground coffee or other material 74 down through feed chute 78 into the top of the inner, presser plunger 75, such material passing downward through the opening 79 in the head of this plunger onto the confined and surrounded layer of paper.

The plug 80 then lowers to close the delivery throat and give the plunger the effect of a solid head, which in this closed condition comes down to compact the material and form the paper, through the medium of the compacted material, into the shape of the mold cavity, Fig. 9. The extent of such movement may be governed, in the illustration, by means of stop screws 155 positioned for engagement with abutments 156.

At the next stop a presser head 118, Fig. 6, comes down to smooth and flatten the outstanding flange portion 117 of the filled container.

At the next or third station, the top or cover layer of filter paper 121 is advanced by the companion feed rolls 128, 129, Fig. 1, into position over the top of the filled container, heat sealed to the flange portion 117 of the container by the heated presser head or platen 122, and the thus sealed length cut from the strip by the blade 142, Fig. 14.

While the conveyer is shifting the last formed and filled container to the second station and the charged mold ahead of that, to the third station, Figs. 1 and 6, the top and bottom sheets of paper 121 and 52, respectively, are advanced over the mold chain, and to clear the flange portions of the containers overlying the tops of the filled molds, these advancing strips are lifted, the strip 121, by the paper guide 131, Fig. 4, fixed on rock shaft 132 and, a moment later, the strip 52, by the paper guide 130, which is pivoted on rock shaft 132 and is picked up by the rocker arm 133 thereon, Fig. 5. In this manner interference is avoided between the advancing molds, the loaded containers carried thereby and the strips of paper which are being advanced while the mold chain is traveling from one station to the next.

At the fifth station, Figs. 1 and 12, the inner and outer presser pads 148, 149, come down to grip the sealed flange portions and outer excess portions of the two paper layers and while yieldingly holding these portions the circular cutter 143 further lowers into the annular groove 45 surrounding the mold cavity to sever excess material and trim the flange to a clean, circular shape.

While described as circular, it will be appreciated that the flange can be cut to any desired outline, by having an appropriately shaped cutter and corresponding groove or cutting shoulder in or on the mold.

After leaving the trimming station the finished cartridges may be discharged by the reversal of the molds at the end of the conveyer travel, or be positively ejected by ejector mechanism such as that illustrated in Fig. 19.

If desired, the cartridges may be discharged directly into containers for packing the same.

The tapered lower end of the plug which closes the loading opening in the hollow pressure plunger serves in effect as a spreader for forcing the material laterally and distributing it more uniformly under the head of the plunger. The sheets of container forming and cover forming filter paper may be taken from continuous strips provided by rolls (not shown) supported below the paper feeding means in the base portion of the machine.

Various changes may be made in structure, arrangement and operation of parts, all within the true scope of the invention. The cartridges, for most purposes, may be quite thin and wafer-like but it is contemplated that, for some materials, they may be rather thick and deep instead of shallow. Instead of being circular in shape they may be oval, square or various other shapes, in which event the machine parts would be shaped correspondingly. While at present it is preferred to make the package entirely of filter paper, it is considered that other materials may be used for the purpose.

While generally practical to seal with heat and pressure, it is within the scope of the invention to seal in other ways, for instance, with pressure alone.

In some instances, for example in sealing with pressure alone, the upper and lower flanges of the cartridge may be crimped together and the corrugations so produced may be circular and concentric with the cartridge, or radial, or be otherwise formed.

Figs. 23 and 24 show how the overlying flanges may be crimped circularly by means of coacting and intermeshing concentric ridges 160 and 161 on the face of the mold 30 and the opposing face of the presser head, which in this instance may be the presser head 162 at the sealing station, the third station in Fig. 6. The pad or head 162 may be heated or not, depending to some extent upon the character of the sheet material used in making the cartridge. If such paper contains or carries thermoplastic medium and heat is used, the seal will be that much more permanent and secure. A sufficient seal can ordinarily be effected with the creasing alone, employing sufficient pressure to effect a complete meshing of ridges in the paper-like material.

Instead of being circular or concentric, the meshing ridges and corrugations may be radial, as represented at 163 in Fig. 25, and it will be appreciated that they may be in other forms and designs, insuring the primary purpose of creating a holding interlock between the flanges of the two layers of material.

What is claimed is:

1. A packaging machine comprising a mold having a cavity, means for advancing a sheet of container forming material across said mold cavity, means for forming said sheet to the shape of said mold cavity, means for loading material to be packaged onto the container forming sheet, means for feeding a sheet of cover forming material to a position over a loaded container in the mold cavity, means for securing said cover sheet to the rim portion of said loaded container, and means operative between successive loading operations of the loading means for lifting portions of said container and cover forming sheets to a position away from the mold.

2. A packaging machine comprising a mold having a cavity, means for advancing a sheet of container forming material across said mold cavity, means for forming said sheet to the shape of said mold cavity, means for loading material to be packaged onto the container forming sheet, means for feeding a sheet of cover forming material over a loaded container in the mold cavity, means for securing said cover forming sheet to the rim portion of said loaded container, and means operative between successive loading operations of the loading means for lifting said container and cover forming sheets to a position away from the mold, said lifting means including separate guides for said sheets arranged and adapted to operate one in advance of the other.

3. A packaging machine comprising a mold having a mold cavity, means for advancing a layer of container forming material to a position across the mold cavity, means for forming said layer to the shape of the mold cavity, means for loading onto said layer a quantity of material to be packaged, said forming and loading means including a hollow plunger for guiding said quantity of loading material into position on said layer and for confining said quantity thereon, and a pressure plunger co-operating with said guiding and confining plunger to force the material being packaged against the container forming layer to shape the latter to the mold cavity, said pressure plunger having a central opening in free communication with the interior of said hollow plunger, and means for closing said opening in the pressure applying stage of operation of said pressure plunger.

4. In a packaging machine the combination of a mold having a container forming cavity, means arranged adjacent said mold to support a supply of container forming material in strip form, means for advancing an end portion of said strip to a position across said mold cavity, means for yieldingly pressing portions of said advanced strip against surfaces of said mold adjacent said cavity, a cutter for severing said end portion of the strip from the supply thereof, and container forming means movable toward and from said mold cavity and arranged and adapted to press said severed end portion into conforming engagement therewith.

5. A packaging machine comprising a mold having a mold cavity, means for advancing a layer of container forming material to a position across the mold cavity, means for forming said layer to the shape of the mold cavity, and means for loading onto said layer a quantity of material to be packaged, said forming and loading means including a hollow plunger for guiding said quantity of material into position on said layer and for confining the same thereon, and a pressure plunger co-operating with said guiding and confining plunger to force the material being packaged against the container forming layer, means for reciprocating said hollow plunger into and out of engagement with that portion of the container forming layer about the mold cavity, said pressure plunger operating within said hollow plunger and having a pressure head for applying pressure to the material on said layer, said pressure applying head having a passage therethrough, a plug for closing said passage, means for reciprocating said plug to effect opening and closing of said passage, means for feeding the material to be packaged into said pressure plunger and means for securing a layer of cover forming material to that portion of the container forming layer about the mold cavity.

GEORGE GREY.

REFERENCES CITED

The following references are of record in the file of this patent:

UNITED STATES PATENTS

| Number | Name | Date |
|---|---|---|
| 646,355 | Butler et al. | Mar. 27, 1900 |
| 1,295,951 | Armstrong | Mar. 4, 1919 |
| 1,980,361 | Spear | Nov. 13, 1934 |
| 2,011,829 | Schnur | Aug. 20, 1935 |
| 2,078,314 | Busche | Apr. 27, 1937 |
| 2,372,406 | Treneer | Mar. 27, 1945 |
| 2,378,324 | Ray et al. | June 12, 1945 |